United States Patent
Decaens

(10) Patent No.: US 11,190,719 B2
(45) Date of Patent: Nov. 30, 2021

(54) SAMPLING DEVICE

(71) Applicant: LYNRED, Palaiseau (FR)

(72) Inventor: Gilbert Decaens, Grenoble (FR)

(73) Assignee: LYNRED, Palaiseau (FR)

( * ) Notice: Subject to any disclaimer, the term of this patent is extended or adjusted under 35 U.S.C. 154(b) by 0 days.

(21) Appl. No.: 17/258,188

(22) PCT Filed: Jul. 26, 2019

(86) PCT No.: PCT/FR2019/051861
§ 371 (c)(1),
(2) Date: Jan. 6, 2021

(87) PCT Pub. No.: WO2020/021216
PCT Pub. Date: Jan. 30, 2020

(65) Prior Publication Data
US 2021/0274118 A1    Sep. 2, 2021

(30) Foreign Application Priority Data
Jul. 27, 2018 (FR) ....................................... 1857053

(51) Int. Cl.
*H04N 5/369* (2011.01)
*H04N 5/3745* (2011.01)
*H04N 5/378* (2011.01)

(52) U.S. Cl.
CPC ........... *H04N 5/3698* (2013.01); *H04N 5/378* (2013.01); *H04N 5/37455* (2013.01)

(58) Field of Classification Search
None
See application file for complete search history.

(56) References Cited

U.S. PATENT DOCUMENTS

| | | |
|---|---|---|
| 2008/0273093 A1 | 11/2008 | Okita et al. |
| 2012/0043454 A1 | 2/2012 | Sakuragi |
| 2013/0229557 A1* | 9/2013 | Hashimoto .......... H04N 5/3745 348/301 |
| 2017/0048475 A1 | 2/2017 | Sakuragi |

* cited by examiner

*Primary Examiner* — Mark T Monk
(74) *Attorney, Agent, or Firm* — Oliff PLC

(57) ABSTRACT

A first input receiving a voltage to be sampled formed by a terminal of a sampling capacitor. An amplifier has a first input connected to another terminal of the sampling capacitor and a second input connected to a reference voltage. The amplifier is supplied by a power supply configured to deliver a reduced current and to supply the amplifier in a first condition during a first period, deliver a rated current and to supply the amplifier in a second condition during a second period, the reduced current being lower than the rated current. During the first period, the first and second inputs of the amplifier are short-circuited.

24 Claims, 4 Drawing Sheets

SAMPLING DEVICE

BACKGROUND OF THE INVENTION

The invention relates to a sampling device, to an analog-to-digital converter comprising one such sampling device and to a sampling method.

STATE OF THE ART

In a large number of activities, a scene is observed by a detection device comprising a photodetector. The photodetector receives a light signal which it transforms into an electrical signal representative of the observed scene.

In a conventional embodiment illustrated in FIG. 1, the photodetector 1 is for example a photodiode that generates a current representative of the brightness of the observed scene. The current emitted by the photodetector is transformed into a voltage $V_{in}$ which is representative of the studied scene by means of a readout circuit 2. The analog voltage $V_{in}$ is transformed into a digital signal by means of an analog-to-digital converter 3. To perform transformation of the analog voltage into a digital signal, voltage $V_{in}$ is sampled by means of a sampling device comprising a capacitor $C_{ech}$ and an amplifier 4.

Amplifier 4 is an active device that is configured to be operational in the worst operating conditions in order to provide the sampling device with a certain ruggedness. Amplifier 4 is therefore designed so as to ensure that the different voltages applied on one of the terminals of capacitor $C_{ech}$ will be able to be sampled within a reasonable time. Amplifier 4 is supplied by a power source 5 that delivers a rated current $i_{nom}$.

In standard operating conditions which represent most of the operating time of the detection device, the voltage variations at the terminals of capacitor $C_{ech}$ do not however correspond to the worst cases which results in a chronic excessive consumption of the sampling device located inside analog-to-digital converter 3.

OBJECT OF THE INVENTION

One object of the invention is to provide a sampling device that presents a lower consumption than sampling devices of the prior art with equivalent performances.

This results tends to be achieved by means of a sampling device comprising:
a sampling capacitor having a first terminal forming a first input of the sampling device designed to receive a signal to be sampled and a second terminal,
an amplifier having a first input terminal connected to the second terminal of the sampling capacitor so as to sample the voltage at the terminals of the sampling capacitor with respect to a reference, and a second input terminal connected to a reference voltage source.

The sampling device is remarkable in that the amplifier is supplied by a current source configured to:
deliver a reduced current and supply the amplifier in a first operating condition during a first period or not supply the amplifier during the first period,
deliver a rated current and supply the amplifier in a second operating condition during a second period subsequent to the first period, the value of the reduced current being lower than the value of the rated current and possibly even zero.

The sampling device is also remarkable in that, during the first period, the second terminal of the sampling capacitor is electrically connected to the reference voltage source.

In one development, the current source is formed by:
a first power source configured to deliver the reduced current and to supply the amplifier in the first operating condition, the amplifier being supplied by the first power source only,
a second power source configured to deliver the rated current and to supply the amplifier in the second operating condition, the amplifier being supplied by the second power source only.

It is also advantageous to provide for the current source to be formed by:
a first power source configured to deliver the reduced current and to supply the amplifier in the first operating condition, the amplifier being supplied by the first power source only,
a second power source configured to deliver the rated current and to supply the amplifier in the second operating condition, the amplifier being supplied by the second power source and by the first power source.

In a particular case, the first power source is configured to deliver a reduced current representing less than half the rated current delivered by the second power source.

In another particular case, the current source is configured so as not to supply the amplifier during at least a part of the first period, the current source being separated from the amplifier by a switch in off state.

In advantageous manner, the current source is configured to have a first period having a duration at least equal to the duration of the second period.

In a more precise embodiment, the current source is configured to have a first period having a duration at least equal to twice the duration of the second period.

It is further possible to provide an analog-to-digital converter comprising a sampling device according to one of the foregoing embodiments whose first input, designed to receive the voltage to be sampled, is formed by the first terminal of the sampling capacitor.

It is a further object of the invention to provide a sampling method that is simple to implement and that enables a reduction of the electrical power consumption to be obtained without impairing the electrical and time-related performances.

The sampling method comprises:
providing a voltage to be sampled on a first terminal of a sampling capacitor, the sampling capacitor having a second terminal connected to a first input terminal of an amplifier, the amplifier having a second input terminal receiving a reference voltage,
sampling the voltage to be sampled during a sampling step.

The sampling method is remarkable in that the sampling step successively comprises:
a first sampling period during which the amplifier is supplied with a reduced current so that the amplifier operates in a first operating condition,
a second sampling period during which the amplifier is supplied with a rated current so that the amplifier operates in a second operating condition, the value of the reduced current being lower than the value of the rated current,
and in that, during the first sampling period, the second terminal of the sampling capacitor receives the reference voltage.

In a particular embodiment, the amplifier is only supplied by a first current source during the first sampling period and the amplifier is only supplied by a second current source during the second sampling period.

In another particular embodiment, the amplifier is only supplied by a first current source during the first sampling period and the amplifier is supplied by a second current source and by the first current source during the second sampling period.

Advantageously the amplifier is not supplied with power during at least a part of the first sampling period.

BRIEF DESCRIPTION OF THE DRAWINGS

Other advantages and features will become more clearly apparent from the following description of particular embodiments of the invention given for non-restrictive example purposes only and represented in the appended drawings, in which.

DETAILED DESCRIPTION

Figure 2:
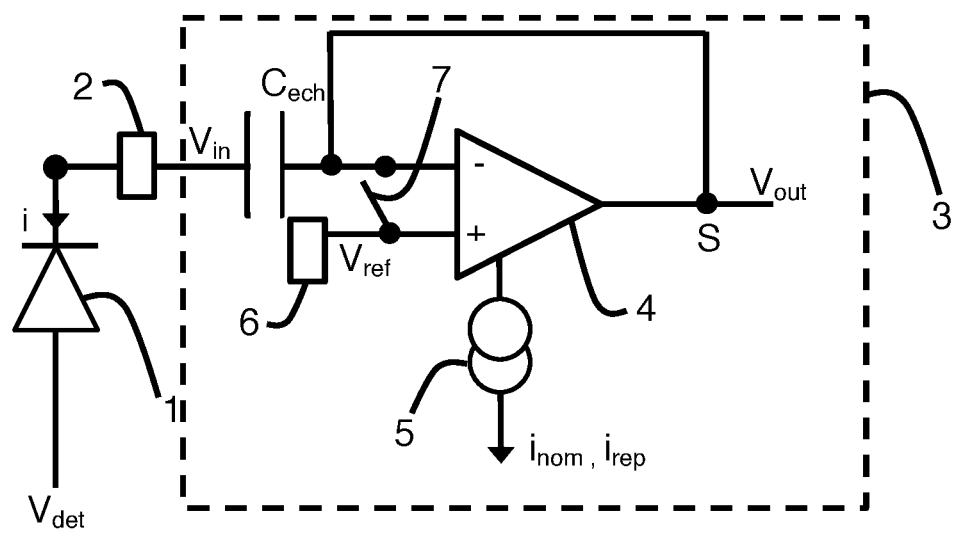
FIG. 2 schematically represents a first embodiment of a detection circuit.

FIG. 2 illustrates a first embodiment of a sampling circuit integrated in an electromagnetic radiation detection circuit. For example purposes, the sampling circuit forms for example the first stage of an analog-to-digital converter 3 or in more general manner the input point of a readout line. In an analog-to-digital converter, the sampling circuit can be used in any stage.

The detection circuit comprises a photodetector 1 that is preferentially a photodiode. Photodetector 1 generates a current representative of the observed scene, i.e. a first signal which is a current signal representative of the observed scene. Photodetector 1 generates charge carriers according to the intensity of the observed signal. Photodetector 1 can be configured to detect an electromagnetic radiation in the visible range or in the infrared range.

The detection circuit also comprises a readout circuit 2 configured to transform the current emitted by photodetector 1 into a voltage representative of the observed scene. Readout circuit 2 delivers a voltage signal to be sampled on its output terminal.

The sampling circuit is configured to store and sample a signal $V_{in}$, here the voltage delivered by readout circuit 2. The sampling circuit receives the voltage signal to be sampled on a first terminal. Voltage signal $V_{in}$ is for example applied on an input terminal of an analog-to-digital converter 3.

The sampling device comprises an amplifier 4 and a sampling capacitor $C_{ech}$. Sampling capacitor $C_{ech}$ forms the input terminal of the sampling device, i.e. it receives voltage $V_{in}$ to be sampled.

In the embodiment illustrated in FIGS. 2, 3, 4, 5, 6 and 7, a first armature of sampling capacitor $C_{ech}$ is connected to an output terminal of readout circuit 2. In the illustrated embodiments, the connection between sampling capacitor $C_{ech}$ and readout circuit 2 is a direct connection. However it is also possible to provide an indirect connection.

The second terminal of sampling capacitor $C_{ech}$ is electrically connected to a first input of amplifier 4. In a particularly advantageous embodiment, amplifier 4 is connected in follower mode, i.e. the first input is electrically connected with the output terminal of amplifier 4. The output terminal delivers output voltage $V_{out}$ of amplifier 4. In advantageous manner, the output terminal of amplifier 4 forms the output terminal of the sampling device.

Amplifier 4 also has a second input terminal connected to a voltage source 6 delivering a reference voltage $V_{ref}$. In this way, the second input terminal receives reference voltage $V_{ref}$. However, as amplifier 4 is not perfect, the first input does not apply voltage $V_{ref}$ on the armature of capacitor $C_{ech}$ but voltage $V_{ref}+\varepsilon$. This voltage difference has to be taken into consideration in the subsequent computing steps in order to eliminate the latter so as to preserve an acceptable conversion quality. For example, voltage $V_{in}$ stored on an armature of capacitor $C_{ech}$ is used in a multiplication, an addition or subtraction or in a transfer onto the output terminal of the amplifier. The voltage that is closest to that supplied on the input terminal therefore has to be used, i.e. voltage $V_{in}$.

Amplifier 4 being an active electronic device, it is supplied by a power source 5 providing a supply current.

The inventors observed that throughout the sampling phase, i.e. while the first armature of capacitor $C_{ech}$ is charging by means of voltage $V_{in}$, the consumption of amplifier 4 can be relatively high whereas amplifier 4 is not delivering any relevant data on its output terminal intended for processing circuits (not shown) connected on the output terminal of the sampling device.

In order to reduce this consumption, the inventors propose to modulate the power supply conditions of amplifier 4 in time so that, during the sampling period of voltage $V_{in}$, the electrical power consumed by amplifier 4 is less than a device of the prior art with an equivalent sampling quality, i.e. with a constant sampling period and a constant sampling precision.

It is advantageous to provide for amplifier 4 to be supplied by a power source 5 configured to deliver at least two different currents to amplifier 4 so as to make the latter operate successively in at least two different operating conditions during the sampling period.

As illustrated in FIGS. 3, 4, 5, 6, 7 and 8, this difference in power supply of amplifier 4 can be achieved using at least two different current sources within power source 5.

Figure 4:
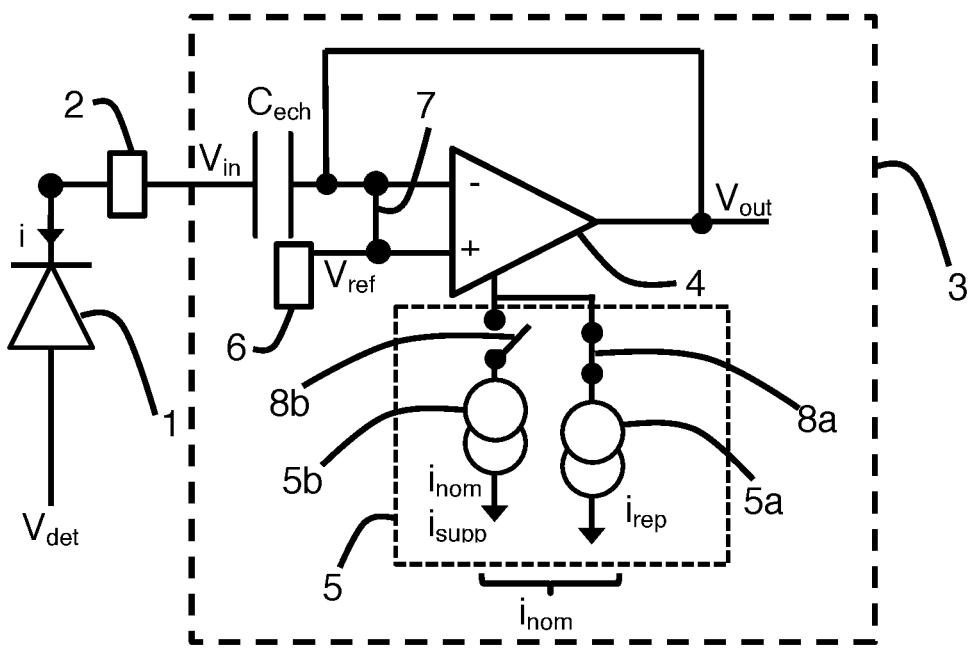
FIGS. 4 and 5 schematically represent first sampling periods according to two different embodiments of a detection circuit, FIGS. 6 and 7 schematically represent second sampling periods according to two different embodiments of a detection circuit.

During a first sampling period illustrated in FIG. 4, power source 5 is configured to deliver a reduced current $i_{rep}$ and to supply amplifier 4 so that the latter is in a first operating condition.

Figure 6:
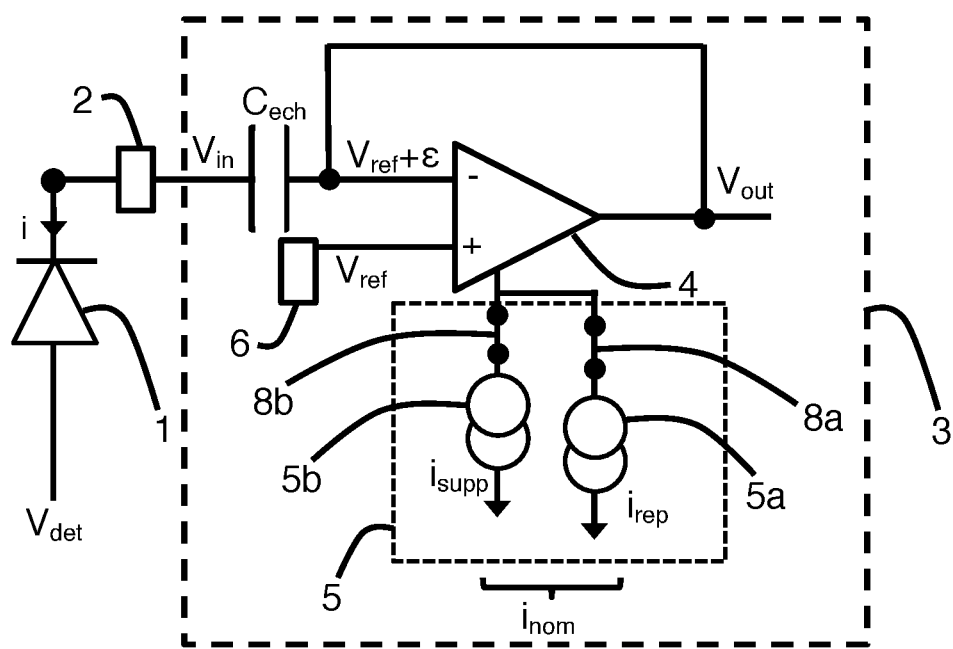
Figure 7:
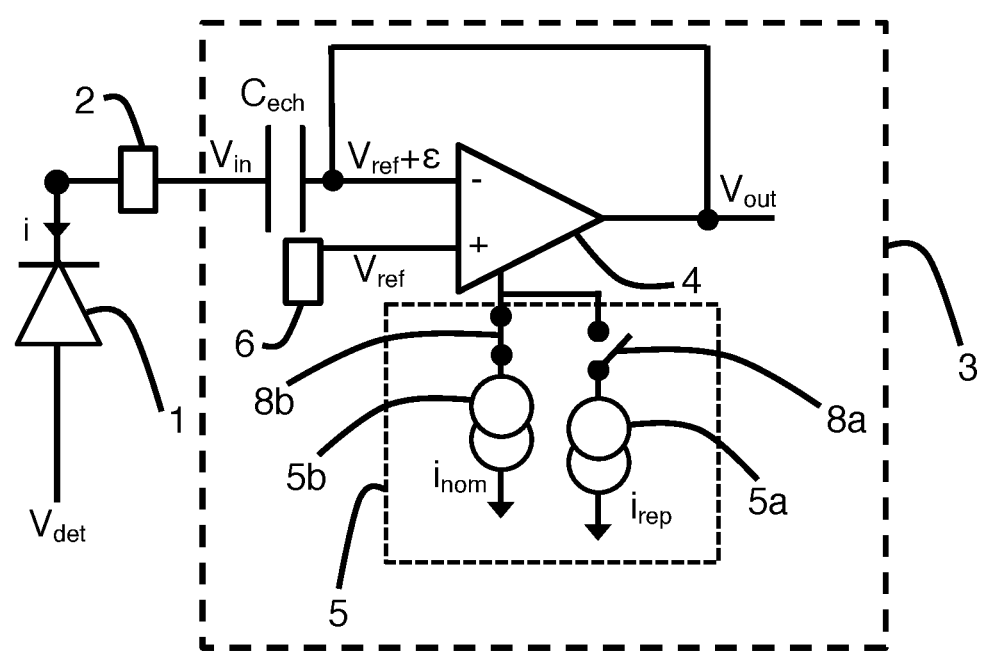

In a second sampling period subsequent to the first sampling period and illustrated in FIGS. 6 and 7, power source 5 is configured to deliver a rated current $i_{nom}$ and to supply amplifier 4 so that the latter is in a second operating condition. The value of reduced current $i_{rep}$ is lower than the value of rated current $i_{nom}$. In the second operating condition, the first input terminal of amplifier 4 can deliver a higher maximum current than in the first operating condition.

Figure 5:
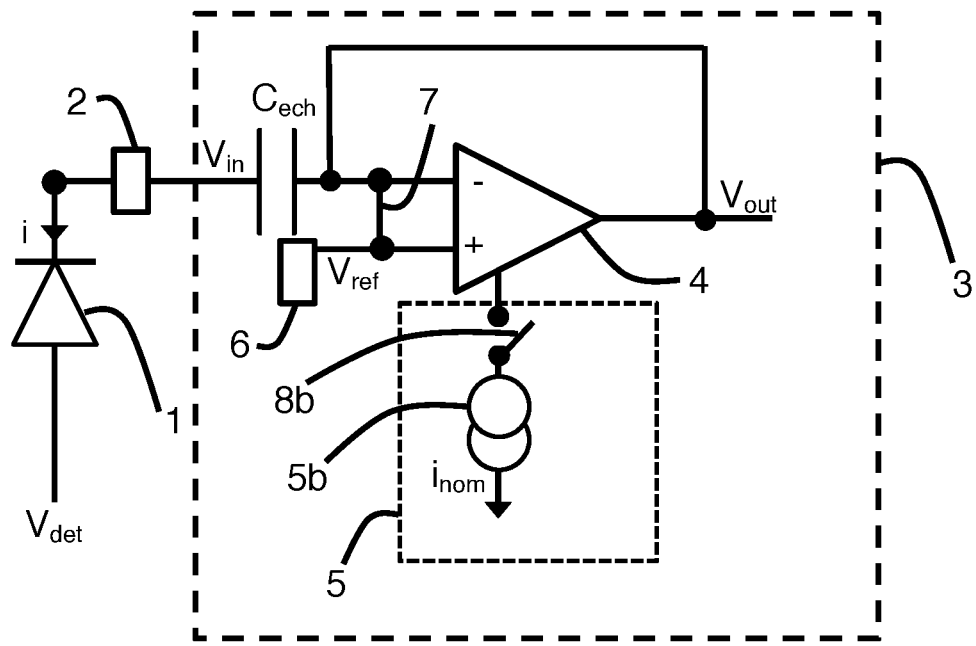

During the first sampling period, the second terminal of sampling capacitor $C_{ech}$ is electrically connected to source 6 of reference voltage $V_{ref}$. In this way, voltage $V_{ref}$ is applied on the second armature of sampling capacitor $C_{ech}$ which can store voltage $V_{in}$ with respect to voltage $V_{ref}$. In one embodiment, voltage $V_{ref}$ is applied on the first input of amplifier 4 by short-circuiting the two inputs of amplifier 4. This configuration is particularly advantageous as it is compact. This short-circuiting can be achieved by means of a switch 7 as illustrated in FIGS. 4 and 5. Short-circuiting enables voltage $V_{ref}$ to be applied on the second armature in simple manner. Alternatively, the second armature of capacitor $C_{ech}$ is disconnected from the first input of amplifier 4. By using a short-circuit between the two input terminals of amplifier 4, it is possible to greatly reduce the consumption of the amplifier and to take advantage of voltage source 6 to charge sampling capacitor $C_{ech}$.

During the first sampling period, voltage $V_{ref}$ is applied by source 6 of reference voltage $V_{ref}$ and not by the first input of amplifier 4. The capacitor charges by means of the current provided by source 6 of reference voltage $V_{ref}$. It is therefore possible to reduce the power supply delivered to amplifier 4 without problems arising on the quality of the data present in sampling capacitor $C_{ech}$. If the voltage applied on the second armature of sampling capacitor $C_{ech}$ was imposed by amplifier 4, there could be large polarisation differences as amplifier 4 is no longer supplied by rated current $i_{nom}$ and is not always able to sample voltage $V_{in}$. The current supplied to amplifier 4 is weak so that the amplifier is not able to charge sampling capacitor $C_{ech}$ to the required level during the first period and the second period.

Figure 3:
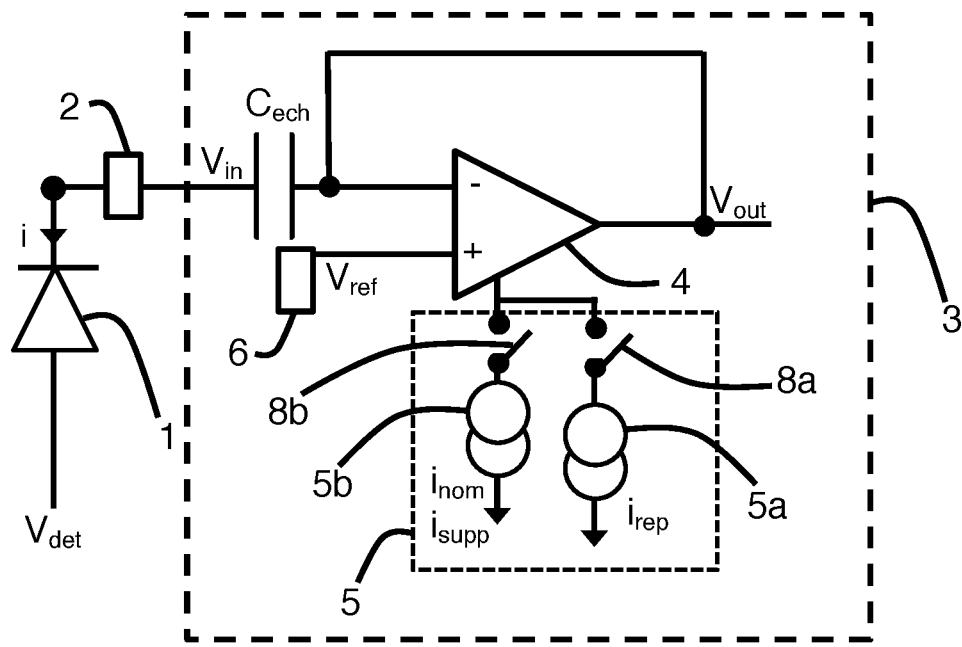
FIG. 3 schematically represents a second embodiment of a detection circuit.

In an embodiment illustrated in FIGS. 3 and 5, it is even possible to provide for amplifier 4 not to be supplied during the first sampling period or at least during a part of the first period. Reduced current $i_{rep}$ can be a zero current and current source 5a may not exist. However, the inventors observed that the absence of power supply at the terminals of amplifier 4 may result in random phenomena when the latter is repowered-on. It therefore appears advantageous to use such an embodiment when the sampling period is long. If the first sampling phase is performed without supplying power to amplifier 4, the second sampling phase can then be longer so that the amplifier reaches a stationary operating regime at the end of the second sampling period. FIG. 3 represents an embodiment enabling amplifier 4 not to be supplied during a part of the first sampling period. Amplifier 4 is supplied with rest current $i_{rep}$ during the other part of the first period (FIG. 4). FIG. 5 represents an embodiment enabling amplifier 4 not to be supplied during the whole of the first sampling period.

In such a configuration, it is particularly advantageous to connect the first input of amplifier 4 directly with the second terminal of sampling capacitor $C_{ech}$.

During the second sampling period illustrated in FIGS. 6 and 7, the source of reference voltage $V_{ref}$ is not directly connected to the second armature of sampling capacitor $C_{ech}$. Switch 7 is in the open or blocking state.

During the second sampling period, sampling capacitor $C_{ech}$ completes its charging to store voltage $V_{in}$. Voltage $V_{ref}+\varepsilon$ is applied on the second terminal of sampling capacitor $C_{ech}$ by means of the first input of amplifier 4. The difference from reference voltage $V_{ref}$ is present on the second terminal of capacitor $C_{ech}$ which means that the voltage stored on the first armature of the capacitor can be easily used in the standard operations of a sampling circuit. This configuration prevents the introduction of a voltage difference equal to $\varepsilon$ in the output result thereby avoiding having to process the signal with additional algorithms in the subsequent processing steps.

During the second sampling period, amplifier 4 is advantageously supplied with a rated current $i_{nom}$ that is higher than reduced current $i_{rep}$ thereby quickly providing the charges enabling voltage $V_{ref}$ to increase to voltage $V_{ref}+\varepsilon$. It is therefore possible to have a short second sampling phase.

By using the first input of amplifier 4 to apply reference voltage $V_{ref}+\varepsilon$ on the second terminal of sampling capacitor $C_{ech}$, the voltage difference that exists between the first and second inputs of the amplifier (also called amplifier offset) is introduced in the sampled measurement thereby facilitating processing of the data by storing an error linked to the amplifier to enable this error to be eliminated the next time the amplifier is used.

Figure 1:
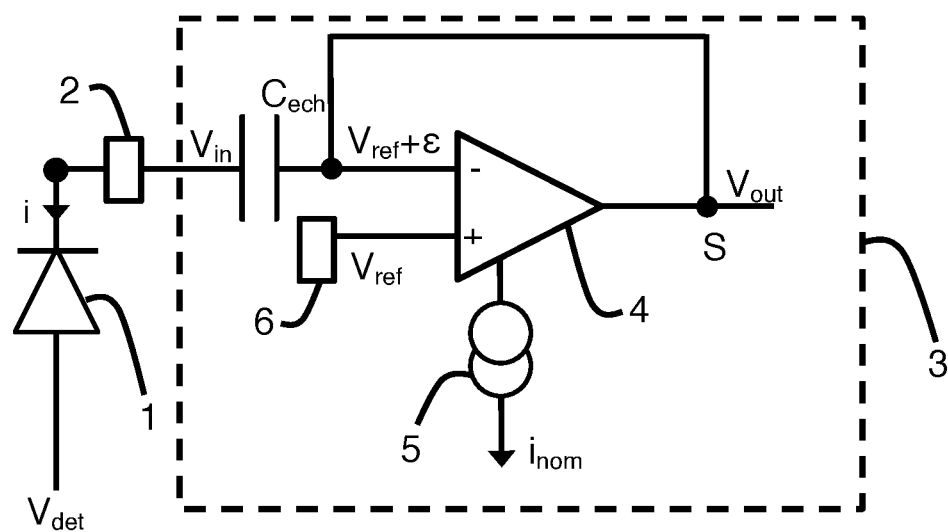
FIG. 1 schematically represents a detection circuit of the prior art.

The second sampling period illustrated in FIGS. 6 and 7 represents operation of the sampling device as in the prior art with the voltage to be sampled $V_{in}$ measured by amplifier 4 in its nominal power supply conditions. The equivalent electrical wiring diagram then corresponds to that of FIG. 1.

In the embodiment illustrated in FIG. 6, current sources 5a and 5b are connected simultaneously to amplifier 4 so that the latter is supplied with rated current $i_{nom}$. In the embodiment illustrated in FIG. 7, only current source 5b is connected to amplifier 4 so that the latter is supplied with rated current $i_{nom}$.

By using two different power supply conditions of amplifier 4, the sampling device consumes less current than a prior art device over the whole sampling time. This configuration enables the same sampling frequencies as those of prior art devices to be kept. The second sampling period is advantageously performed with rated current, i.e. the scheduled supply current for standard and moreover optimal operation of amplifier 4 to weakly charge capacitor $C_{ech}$.

In order to achieve the best possible gain in consumption, it is advantageous to reduce the value of reduced current $i_{rep}$ and/or the duration of the second sampling period with respect to the total sampling time as far as possible. In advantageous manner, the duration of the first sampling period is equal to at least 10% of the total sampling time, preferably at least 50% of the total sampling time.

The inventors observed a notable gain in current consumption without loss of performance when the duration of the first sampling period is equal to the duration of the second sampling period. Very good results are also expected when the first sampling period represents a longer time than that of the second sampling period, i.e. the first sampling period represents more than half of the total sampling time. In other words, power source 5 can be configured to have a first sampling period having a duration at least equal to the second sampling period. In advantageous manner, power source 5 is configured to have a first sampling period having a duration at least equal to twice the duration of the second sampling period. This configuration also enables good results to be obtained when the duration the first sampling period is comprised between 80% and 90% of the total sampling time.

In advantageous manner, the second period is at least equal to 10% of the duration of the first sampling period to ensure that the first input terminal of amplifier 4 delivers voltage $V_{ref}+\varepsilon$.

It is advantageous to provide for the value of reduced current $i_{rep}$ to represent less than 80% of the value of rated current $i_{nom}$. Preferentially, the value of reduced current $i_{rep}$ represents less than 50% of the value of rated current $i_{nom}$ and even more preferentially less than 30%. As indicated in the foregoing, it is also possible to provide for the reduced current to correspond to a zero current.

It is also possible to provide for the first sampling period to be divided into at least two successive elementary periods corresponding to different power supply conditions.

It is for example advantageous to provide for the first elementary period to correspond to an absence of supply current at the terminals of amplifier 4 and the second elementary period to correspond to power supply with a reduced current $i_{rep}$ representing between 30% and 50% of rated current $i_{nom}$. In this way, shutdown of amplifier 4 during the first elementary period enables a maximum gain in consumption to be achieved and the second elementary period enables controlled power-up of amplifier 4 to prevent measurement artefacts. The second elementary period is subsequent to the first elementary period.

To obtain shutdown of amplifier 4, it is possible to switch power source 5 off, but it is also possible to apply a weak current having a lower value than the value necessary to power amplifier 4 on. These two options can be used to shut amplifier 4 down during the first sampling period or a part of the first sampling period. As an alternative, it is possible to disconnect power source 5 from amplifier 4 by switching switch 8a/8b connecting current source 5 with amplifier 4 to off state.

Power source 5 is advantageously configured to deliver two different currents, reduced current $i_{rep}$ and rated current $i_{nom}$. Power source 5 can be formed in different manners to provide different power supply conditions to amplifier 4 in the course of time.

In a first configuration illustrated in FIGS. 3 and 4, power source 5 delivers reduced current $i_{rep}$ on a first output terminal and delivers an additional current $i_{supp}$ on a second output terminal. The additional current is chosen such that power source 5 delivers rated current $i_{nom}$ from the first output terminal and from the second output terminal ($i_{nom}=i_{rep}+i_{supp}$).

These two output terminals make it possible to dissociate the two operations expected for amplifier 4 with two complementary power sources to form rated current $i_{nom}$. The two power sources are connected to the supply input of amplifier 4 by means of two different switches 8a and 8b. First switch 8a electrically connects amplifier 4 with first power source 5a delivering reduced current $i_{rep}$. Second switch 8b electrically connects amplifier 4 with second power source 5b delivering additional current $i_{supp}$.

During the first sampling period (FIG. 4), first switch 8a is turned-on to deliver reduced current $i_{rep}$. During the second sampling period (FIG. 6), first and second switches 8a and 8b are turned-on to deliver rated current $i_{nom}$.

In a second configuration illustrated in FIGS. 4 and 7, power source 5 delivers reduced current $i_{rep}$ on a first output terminal and delivers rated current $i_{nom}$ on a second output terminal. These two output terminals represent two specific supply sources 5a and 5b respectively each delivering the required currents. The two specific supply sources are connected to the supply input of amplifier 4 by means of two different switches 8a and 8b. First switch 8a electrically connects amplifier 4 with first power source 5a delivering reduced current $i_{rep}$. Second switch 8b electrically connects amplifier 4 with second power source 5b delivering rated current $i_{nom}$.

By switching opening and closing of first and second switches 8a and 8b, it is possible to supply amplifier 4 with reduced current $i_{rep}$ or with rated current $i_{nom}$ if the two switches 8a and 8b are always in opposite states throughout the whole sampling period. It is also possible to provide for the two switches 8a and 8b to be simultaneously in off state to power amplifier 4 off (FIG. 3).

In another embodiment, the first sampling phase is performed without supplying amplifier 4 (FIG. 3). Capacitor $C_{ech}$ charges between voltage $V_{in}$ and voltage $V_{ref}$. During the second sampling phase, amplifier 4 is supplied with rest current $I_{rep}$ (FIG. 4). The inventors observed that the use of rest current is possible as the voltage difference between voltage Vref and voltage $V_{ref}+\varepsilon$ is small which makes it possible to use an amplifier 4 delivering less current. However, precautions have to be taken and the duration of the second sampling phase can be increased. In the computation or transfer step that follows the sampling step, amplifier 4 is supplied with rated current $i_{nom}$.

To sample voltage $V_{in}$, voltage $V_{in}$ is applied on the first terminal of sampling capacitor $C_{ech}$. The voltage is sampled during a predefined sampling time. The sampling time is broken down into at least two sampling phases. During the first sampling phase, the amplifier is supplied with the reduced current or is not supplied with any current. During the second sampling phase, the amplifier is supplied with a current that is higher than the current applied during the first sampling phase. Voltage $V_{in}$ is made to vary. The sampling device is configured to apply several successive sampling periods to monitor the variations of voltage $V_{in}$. The second sampling phase is subsequent to the first sampling phase in each sampling period. In advantageous manner, the duration of the first sampling phase is constant for the multiple sampling periods. The same is the case for the multiple second sampling phases.

As illustrated in the figures, the first input of the amplifier is connected to the output of the amplifier by an electrical connection not presenting an electrical capacity. In other words, the electrical connection connecting the input and output does not present a capacitive load.

The sampling circuit can have a control circuit (not shown) that actuates the different switches 7, 8a and 8b and possibly other components so as to define the first sampling period, second sampling period and voltage computation and transfer steps.

Photodetector 1 can be formed by any device configured to transform a received electromagnetic signal into an electric current. For example purposes, photodetector 1 can be a photodiode, a quantum well or multiquantum well device. It is further possible to use a CMOS sensor as photodetector.

Photodetector 1 can be made from silicon, from II-VI materials or from III-V materials. The photodetector can for example be made from materials chosen from HgCdTe, InSb or InGaAs.

Photodetector 1 can be configured to detect visible radiation and/or infrared radiation.

The detection circuit can be configured to operate at ambient temperature or can be associated with a cooling device to form a cooled detection circuit. In advantageous manner, the cooled detection circuit is configured to have an operating temperature of less than 200K.

The sampling device is presented as a component of a detection device, but it is quite possible to provide for the sampling device to be able to be used in other devices or circuits, for example in an analog-to-digital converter not included in a detection device or in another structure enabling sampling to be performed from a sampling capacitor without being part of an analog-to-digital converter.

In advantageous manner, the rated current corresponds to the minimum current to charge the sampling capacitor when voltage $V_{in}$ corresponds to the worst case in a predefined sampling time. For example, voltage $V_{in}$ corresponds to the terminal that is farthest from the initial voltage present on the terminal of the sampling capacitor. In this way, during the sampling period of the circuit, the maximum quantity of electric charges has to be accumulated in order to have data representative of $V_{in}$.

The value of the rated current is a function of the value of the sampling capacitor which represents the number of electric charges to be stored. The value of the rated current is also a function of the value of $V_{in}$ and of the sampling time.

As illustrated in FIGS. 1 to 7, it is advantageous to provide for the input of amplifier 4 to be connected to the output of amplifier 4 by a connection not presenting a capacitive load.

The invention claimed is:

1. A sampling device comprising:
   a sampling capacitor ($C_{ech}$) having a first terminal forming a first input of the sampling device designed to receive a signal to be sampled, and a second terminal,
   an amplifier having a first input terminal connected to the second terminal of the sampling capacitor ($C_{ech}$) so as to sample the voltage at the terminals of the sampling capacitor ($C_{ech}$) with respect to a reference, and a second input terminal connected to a source (6) of reference voltage ($V_{ref}$),
   a current source supplying the amplifier, the current source being configured to:
      deliver a reduced current ($i_{rep}$) and supply the amplifier in a first operating condition during a first period or not supply the amplifier during the first period,
      deliver a rated current ($i_{nom}$) and supply the amplifier in a second operating condition during a second period subsequent to the first period, the value of the reduced current ($i_{rep}$) being lower than the value of the rated current ($i_{nom}$) and possibly even zero,
   sampling device wherein, during the first period, a switch short-circuits the first input terminal with the second input terminal of the amplifier and the source of reference voltage ($V_{ref}$) applies a current charging the second terminal of the sampling capacitor ($C_{ech}$) and in that, during the second period, the switch is in blocking state.

2. The sampling device according to claim 1, wherein, the current source is formed by:
   the first power source configured to deliver the reduced current ($i_{rep}$) and to supply the amplifier in the first operating condition, the amplifier being supplied by the first power source only,
   the second power source configured to deliver the rated current ($i_{nom}$) and to supply the amplifier in the second operating condition, the amplifier being supplied by the second source power source only.

3. The sampling device according to claim 1, wherein, the current source is formed by:
   the first power source configured to deliver the reduced current ($i_{rep}$) and to supply the amplifier in the first operating condition, the amplifier being supplied by the first power source only,
   the second power source configured to deliver the rated current ($i_{nom}$) and to supply the amplifier in the second operating condition, the amplifier being supplied by the second power source and by the first power source.

4. The sampling device according to claim 2, wherein the first power source is configured to deliver a reduced current ($i_{rep}$) representing less than half the rated current ($i_{nom}$) delivered by the second power source.

5. The sampling device according to claim 1, wherein the current source is configured not to supply the amplifier during at least a part of the first period, the current source being separated from the amplifier by the switch in blocking state.

6. The sampling device according to claim 1, wherein the current source is configured to have a first period having a duration at least equal to the duration of the second period.

7. The sampling device according to claim 1, wherein the current source is configured to have a first period having a duration at least equal to twice the duration of the second period.

8. An analog-to-digital converter comprising:
   the sampling device according to claim 1 whose first input, designed to receive the voltage to be sampled ($V_{in}$), is formed by the first terminal of the sampling capacitor ($C_{ech}$).

9. A sampling method of a voltage comprising:
   providing a voltage to be sampled ($V_{in}$) on a first terminal of a sampling capacitor ($C_{ech}$), the sampling capacitor ($C_{ech}$) having a second terminal connected to a first input terminal of an amplifier, the amplifier having a second input terminal receiving a reference voltage ($V_{ref}$),
   sampling the voltage to be sampled ($V_{in}$) during a sampling step,
   wherein the sampling step successively comprises:
      a first sampling period during which the amplifier is supplied with a reduced current ($i_{rep}$) so that the amplifier operates in a first operating condition,
      a second sampling period during which the amplifier is supplied with a rated current ($i_{nom}$) so that the amplifier operates in a second operating condition, the value of the reduced current ($i_{rep}$) being lower than the value of the rated current ($i_{nom}$), wherein during the first sampling period, the first input terminal and the second input terminal of the amplifier are short-circuited by a switch so that a source of reference voltage ($V_{ref}$) applies a current charging the sampling capacitor and in that during the second sampling period, the switch is in blocking state so that the sampling capacitor ($C_{ech}$) receives a current from the first input terminal of the amplifier.

10. The sampling method according to claim 9 wherein the amplifier is supplied only by a first current source during the first sampling period and the amplifier is supplied only by a second current source during the second sampling period.

11. The sampling method according to claim 9 wherein the amplifier is supplied only by a first current source during the first sampling period and the amplifier is supplied by a second current source and by the first current source during the second sampling period.

12. The sampling method according to claim 9 wherein the amplifier is not supplied during at least a part of the first sampling period.

13. The sampling device comprising:
   the sampling capacitor having a first terminal forming a first input of the sampling device designed to receive a signal to be sampled, and a second terminal,
   the amplifier having a first input terminal connected to the second terminal of the sampling capacitor so as to sample the voltage at the terminals of the sampling capacitor with respect to a reference, and a second input terminal connected to a source of reference voltage,
   the current source supplying the amplifier, the current source being configured to:
      deliver a reduced current and supply the amplifier in a first operating condition during a first period or not supply the amplifier during the first period,
      deliver a rated current and supply the amplifier in a second operating condition during a second period subsequent to the first period, the value of the reduced current being lower than the value of the rated current and possibly even zero, wherein, during the first period, a switch short-circuits the first input terminal with the second input terminal of the amplifier and the source of reference voltage applies a current charging the second terminal of the sampling capacitor and wherein, during the second period, the switch is in blocking state.

14. The sampling device according to claim 13, wherein the current source is formed by:
   the first power source configured to deliver the reduced current and to supply the amplifier in the first operating condition, the amplifier being supplied by the first power source only,
   the second power source configured to deliver the rated current and to supply the amplifier in the second operating condition, the amplifier being supplied by the second source power source only.

15. The sampling device according to claim 13, wherein the current source is formed by:
   the first power source configured to deliver the reduced current and to supply the amplifier in the first operating condition, the amplifier being supplied by the first power source only,
   the second power source configured to deliver the rated current and to supply the amplifier in the second operating condition, the amplifier being supplied by the second power source and by the first power source.

16. The sampling device according to claim 14, wherein the first power source is configured to deliver a reduced current representing less than half the rated current delivered by the second power source.

17. The sampling device according to claim 13, wherein the current source is configured not to supply the amplifier during at least a part of the first period, the current source being separated from the amplifier by the switch in blocking state.

18. The sampling device according to claim 13, wherein the current source is configured to have a first period having a duration at least equal to the duration of the second period.

19. The sampling device according to claim 18, wherein the current source is configured to have a first period having a duration at least equal to twice the duration of the second period.

20. An analog-to-digital converter comprising:
   the sampling device according to claim 13 whose first input, designed to receive the voltage to be sampled, is formed by the first terminal of the sampling capacitor.

21. The sampling method of a voltage comprising:
   providing a voltage to be sampled on a first terminal of a sampling capacitor, the sampling capacitor having a second terminal connected to a first input terminal of an amplifier, the amplifier having a second input terminal receiving a reference voltage,
   sampling the voltage to be sampled during a sampling step,
wherein the sampling step successively comprises:
   the first sampling period during which the amplifier is supplied with a reduced current so that the amplifier operates in a first operating condition,
   the second sampling period during which the amplifier is supplied with a rated current so that the amplifier operates in a second operating condition, the value of the reduced current being lower than the value of the rated current,
wherein during the first sampling period, the first input terminal and the second input terminal of the amplifier are short-circuited by a switch so that a source of reference voltage applies a current charging the sampling capacitor and in that during the second sampling period, the switch is in blocking state so that the sampling capacitor receives a current from the first input terminal of the amplifier.

22. The sampling method according to claim 21 wherein the amplifier is supplied only by a first current source during the first sampling period and the amplifier is supplied only by a second current source during the second sampling period.

23. The sampling method according to claim 21 wherein the amplifier is supplied only by a first current source during the first sampling period and the amplifier is supplied by a second current source and by the first current source during the second sampling period.

24. The sampling method according to claim 21 wherein the amplifier is not supplied during at least a part of the first sampling period.

* * * * *